(12) United States Patent
Moon et al.

(10) Patent No.: US 11,339,840 B2
(45) Date of Patent: May 24, 2022

(54) VEHICLE FLOATING DISC HUB ASSEMBLY

(71) Applicant: SEMYUNGTECH, Seoul (KR)

(72) Inventors: Seongwon Moon, Asan-si (KR);
Sangsun Park, Iksan-si (KR)

(73) Assignee: SEMYUNGTECH, Seoul (KR)

( * ) Notice: Subject to any disclaimer, the term of this patent is extended or adjusted under 35 U.S.C. 154(b) by 61 days.

(21) Appl. No.: 16/945,238

(22) Filed: Jul. 31, 2020

(65) Prior Publication Data

US 2022/0010850 A1  Jan. 13, 2022

(30) Foreign Application Priority Data

Jul. 13, 2020 (KR) ........................ 10-2020-0086410

(51) Int. Cl.
| | | |
|---|---|---|
| *B22C 9/02* | (2006.01) | |
| *F16D 65/12* | (2006.01) | |
| *B60B 27/00* | (2006.01) | |
| *F16D 55/226* | (2006.01) | |
| *F16D 65/02* | (2006.01) | |

(52) U.S. Cl.
CPC ........ *F16D 65/123* (2013.01); *B60B 27/0052* (2013.01); *B60B 27/0078* (2013.01); *F16D 55/226* (2013.01); *F16D 2065/1344* (2013.01); *F16D 2065/1384* (2013.01)

(58) Field of Classification Search
CPC .......... B22D 18/02; B22D 18/04; B22C 9/02; F16D 65/12; F16D 65/123
USPC ......................................... 188/18 A, 218 XL
See application file for complete search history.

(56) References Cited

U.S. PATENT DOCUMENTS

2008/0128229 A1  6/2008 Pahle
2010/0307875 A1  12/2010 Ilg et al.

FOREIGN PATENT DOCUMENTS

| CN | 206522384 | * | 9/2017 | ............ F16D 65/78 |
|---|---|---|---|---|
| KR | 20-1997-0042396 U | | 7/1997 | |
| KR | 10-2011-0059036 A | | 6/2011 | |
| KR | 10-2012-0029921 A | | 3/2012 | |
| KR | 10-2018-0105808 A | | 10/2018 | |
| KR | 10-2066070 B1 | | 1/2020 | |
| KR | 10-2020-0042201 A | | 4/2020 | |

* cited by examiner

*Primary Examiner* — Christopher P Schwartz
(74) *Attorney, Agent, or Firm* — Novick, Kim & Lee, PLLC; Sang Ho Lee; Hyun Woo Shin

(57) ABSTRACT

A vehicle floating disc hub assembly includes a hub portion that includes a bearing housing provided on an inner circumferential surface such that a bearing coupled to an axle is mounted, a flange portion provided in one end in an axial direction, and a plurality of disc fastening grooves provided in the other end; and a disc portion mounted on the hub portion having a hub fastener to be fastened to the disc fastening groove through a fastening member corresponding to the disc fastening groove. The fastening member includes a spring clip mounted between the disc fastening groove and the hub fastener to form a contact force therewith, a spring plate formed to have an elastic force in the axial direction of the axle and placed in the spring clip, and a fastening bolt that couple to the hub fastener through the spring plate.

8 Claims, 22 Drawing Sheets

| TYPE | | | EMBODIMENT | COMPARATIVE EXAMPLE 1 | COMPARATIVE EXAMPLE 2 |
|---|---|---|---|---|---|
| WEIGHT | | | 39.4kg | 53.331kg | 54.752kg |
| ANALYSIS RESULT | BRAKE MAXIMAL TEMPERATURE | ONCE | 541°C | 544°C | 544°C |
| | | FIVE TIMES | 985°C | 1003°C | 1038°C |
| | DISC DEFORMATION AMOUNT | | 0.453 | 0.480 | 0.483 |

EMBODIMENT(457Mpa)

COMPARATIVE EXAMPLE 1(1091Mpa)

COMPARATIVE EXAMPLE 2(1945Mpa)

VEHICLE FLOATING DISC HUB ASSEMBLY

CROSS-REFERENCE TO RELATED APPLICATIONS

This application claims priority under 35 U.S.C. § 119 to Korean Patent Application No. 10-2020-0086410, filed on Jul. 13, 2020, in the Korean Intellectual Property Office, the disclosures of which are incorporated herein by reference in their entirety.

BACKGROUND

1. Field

The present disclosure relates to a vehicle disc hub assembly, and more particularly, to a vehicle floating disc assembly that forms a floating structure capable of being freely deformed in an axial direction and in a direction opposite to a centrifugal direction without forcibly constraining thermal deformation of a disc assembled in in a hub.

2. Description of the Related Art

A brake disc mounted in a vehicle is an apparatus that decelerates or stops a vehicle while driving or maintains a stopped state. The brake disc obtains braking force by strongly pressurizing both sides of a plate-shaped disc, which rotates together with a wheel, with brake pads.

The brake disc generally includes a disc that rotates together with a wheel, brake pads arranged on both sides of the disc, a piston that pressurizes the brake pads toward the disc, and a caliper that supports the piston and the brake pads, and is connected to an axle through a hub.

A problem of an assembly of the brake disc and the hub is that a surface of the disc may crack due to deterioration when heat is not smoothly discharged during braking.

In addition, when a weight of a vehicle is heavy, not only is fuel efficiency reduced, but also braking force is greatly reduced in downhill, and there is a risk of a fire hazard as well as cracking of a surface of the disc due to frequent braking. Thus, it is very important to easily discharge the heat of the brake disc and the hub and to reduce the weight thereof.

Meanwhile, an example of an assembly of a brake disc and a hub of related art is disclosed in Korean Patent Registration No. 10-1294035 (STRUCTURE OF AXLE ASSEMBLY OF DRIVING WHEEL).

As described in Korean Patent Registration No. 10-1294035, a disc hub assembly of the related art generally uses a method in which a bolt is fastened by axially engaging a disc and a hub when fastening the hub for coupling with an axle.

However, the disc hub assembly of the bolt direct fastening method has a problem that contraction and expansion of a fastening portion is repeated, which may cause thermal deformation and noise because thermal stress is concentrated in the fastening portion. In severe cases, damage to the disc or weakening of fastening force may cause a vehicle accident.

SUMMARY

The present disclosure is proposed to solve the above-described problems and aims for providing a vehicle floating disc hub assembly that significantly reduces a weight compared to the related art while easily discharging heat by forming a floating structure capable of being freely deformed in an axial direction and in a direction opposite to a centrifugal direction without forcibly constraining thermal deformation of a disc of a vehicle.

Provided is a vehicle floating disc hub assembly including a hub portion that includes a bearing housing provided on an inner circumferential surface such that a bearing coupled to an axle is mounted, a flange portion provided in one end in an axial direction, and a plurality of disc fastening grooves provided in the other end; and a disc portion mounted on the hub portion having a hub fastener to be fastened to the disc fastening groove through a fastening member corresponding to the disc fastening groove. The fastening member includes a spring clip mounted between the disc fastening groove and the hub fastener to form a contact force with the disc fastening groove and the hub fastener, a spring plate formed to have an elastic force in the axial direction of the axle and placed in the spring clip, and a fastening bolt that couple to the hub fastener through the spring plate. The disc fastening groove is formed such that a direction of an outer peripheral surface of the hub portion is opened. The disc portion is formed to have a floating structure capable of being freely deformed in an axial direction and in a direction opposite to a centrifugal direction without forcibly constraining thermal deformation of the disc portion.

The hub portion may form a shape in which an outer diameter gradually expands from the disc fastening groove to the flange portion, and a plurality of straight ribs may be provided along the outer circumferential surface between the disc fastening groove and the flange portion.

The bearing housing may be inserted into the inner circumferential surface of the hub portion by a differential pressure casting method, and a serration portion may be formed on the inner circumferential surface of the hub portion to prevent deviation of the inserted bearing housing.

The hub fastener may include an insertion portion that is formed to protrude in an inner circumference along an inner circumferential surface of the disc portion and is inserted into the disc fastening groove to be mounted, and a positioning surface for determining a position of the disc portion in the axial direction for the hub portion by forming an extended area more than the disc fastening groove on both sides of an end portion with respect to the other side of a protruding end of the inserting portion in a fastening bolt inserting direction and for preventing deviation in one axial direction.

The disc fastening groove may be provided with a disc through-hole having an area through which the positioning surface is configured to pass. When the disc portion is mounted in the hub portion, the disc portion may be placed on a circumference of the hub portion such that the positioning surface passes through the disc through-hole, and thereafter, the disc portion rotates such that the hub fastener faces the disc fastening groove in the same axis at a corresponding position, and after the disc portion is pulled such that the hub fastener is inserted into the disc fastening groove, the disc portion may be mounted by being fastened through the fastening member.

In the spring clip, an "u"-shaped clip cutting portion may be formed in a clip body to provide elastic force in a vertical direction.

The spring plate may include a cutting portion formed in some directions from a bolt through-hole through which an end portion of the fastening bolt passes.

In the disc portion, an inner side portion of a circumferential surface may form a step difference of a deeper depth than an outer side portion of the circumferential surface in the centrifugal direction.

A vehicle floating disc hub assembly according to an embodiment of the present disclosure is formed to have a floating structure that freely deforms in an axial direction and in a direction opposite to a centrifugal direction without forcibly constraining thermal deformation of a disc generated when braking is braked, and thus, there is an advantage in that even when the vehicle floating disc hub assembly is applied to a commercial vehicle having a heavy weight, heat is easily discharged, and durability against thermal stress is significantly increased.

In addition, the vehicle floating disc hub assembly is formed to have a structure capable of maximally reducing a weight in terms of a material and a shape, and thus, a braking power of a vehicle increases and fuel consumption is reduced.

In addition, the vehicle floating disc hub assembly has an excellent advantage in reducing vibration and noise.

In addition, the effects of the embodiments of the present disclosure described above are not limited to the above description and may further include all effects that may be expected from the specification and drawings.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
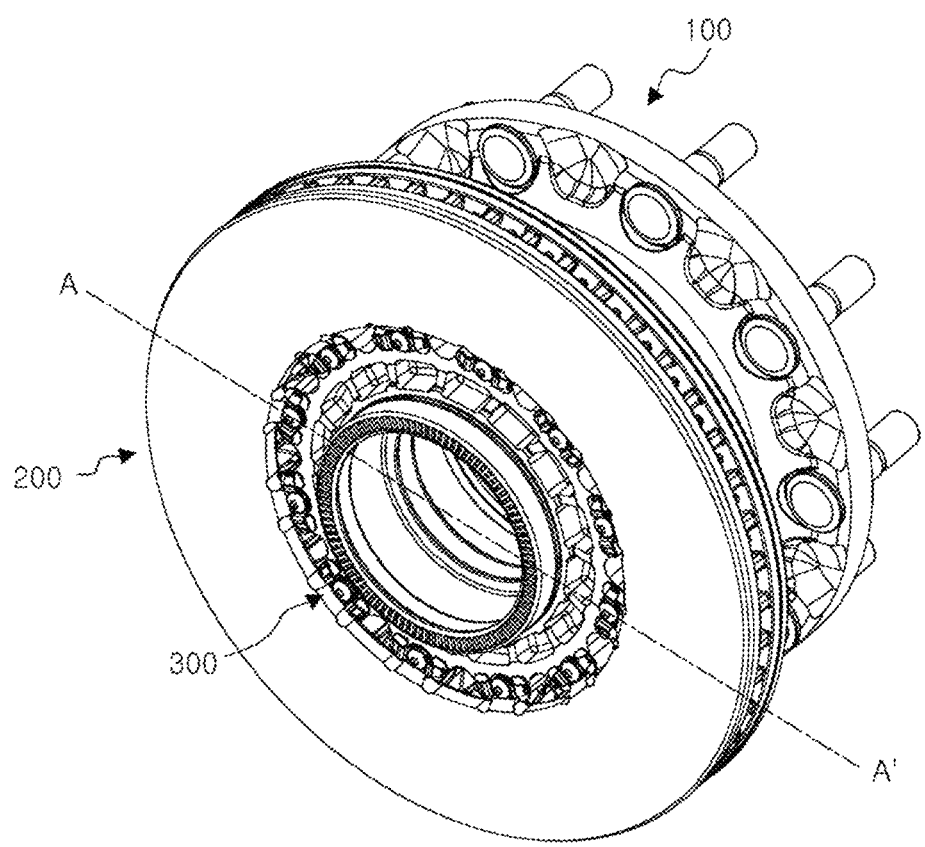
FIG. 1 is a perspective view of a vehicle floating disc hub assembly according to an embodiment of the present disclosure.

Hereinafter, the present disclosure described with reference to the drawings is not limited to a specific embodiment, and various modifications thereof may be made, and various embodiments may be provided. In addition, it should be understood that below description includes all modifications, equivalents, and substitutes included in the idea and scope of the present disclosure.

In the following description, terms such as first and second are used to describe various configuration elements and are not limited in meaning to themselves and are used only to distinguish one configuration element from other configuration elements.

The same reference numerals used throughout the present specification denote the same configuration elements.

A singular expression used in the present disclosure includes a plural expression unless the context clearly indicates otherwise. In addition, it should be interpreted that terms such as "include", "provide", and "have" described below are intended to designate existence of characteristics, numbers, steps, operations, configuration elements, components, or a combination thereof described in the specification, and it should be understood that the terms do not preclude existence or addition possibility of one or more other characteristics, numbers, steps, operations, configuration elements, components, or a combination thereof.

Unless otherwise defined, all terms used herein and including technical or scientific terms have the same meaning as commonly understood by those skilled in the art to which the present disclose belongs. Terms such as terms defined in a commonly used dictionary should be interpreted as having meanings consistent with meanings in a context of a related technology, and should not be interpreted as ideal or excessively formal meanings unless explicitly defined in the present application.

In addition, in description made with reference to the accompanying drawings, the same reference numerals are assigned to the same configuration elements regardless of reference numerals, and redundant descriptions thereof will be omitted. In the description of the present disclosure, when it is determined that detailed description of the related known technology may unnecessarily obscure the subject matter of the present disclosure, the detailed description will be omitted.

Hereinafter, a vehicle floating disc hub assembly according to an embodiment of the present disclosure will be described in detail with reference to the accompanying drawings, and a specific embodiment thereof will be described.

Figure 2:
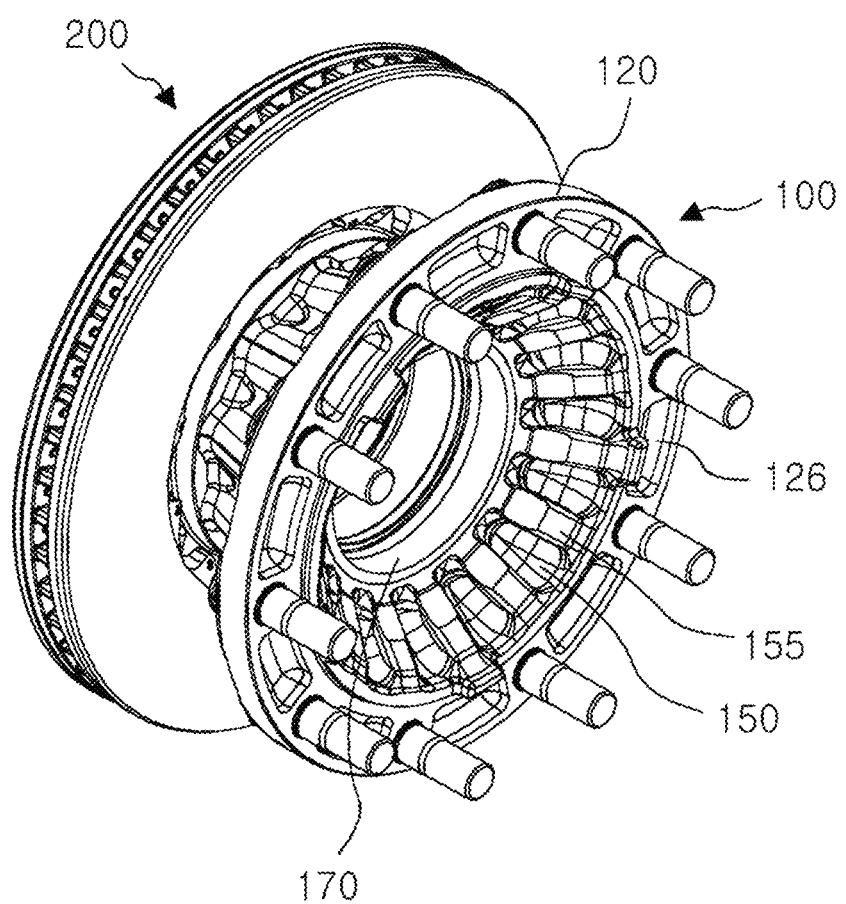
FIG. 2 is a rear perspective view of the vehicle floating disc hub assembly of FIG. 1.

FIG. 1 is a perspective view of a vehicle floating disc hub assembly according to an embodiment of the present disclosure, and FIG. 2 is a rear perspective view of the vehicle floating disc hub assembly of FIG. 1.

Figure 3:
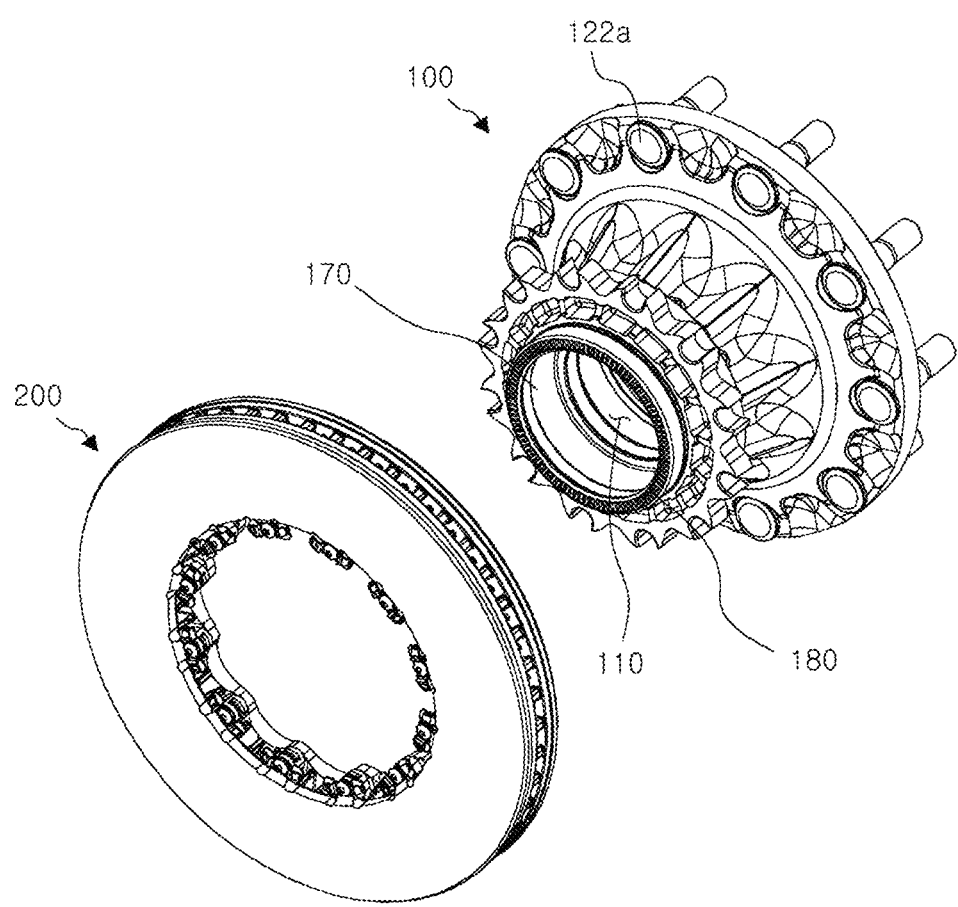
FIG. 3 is an exploded view of a hub portion and a disc portion of the vehicle floating disc hub assembly of FIG. 1.
Figure 4:
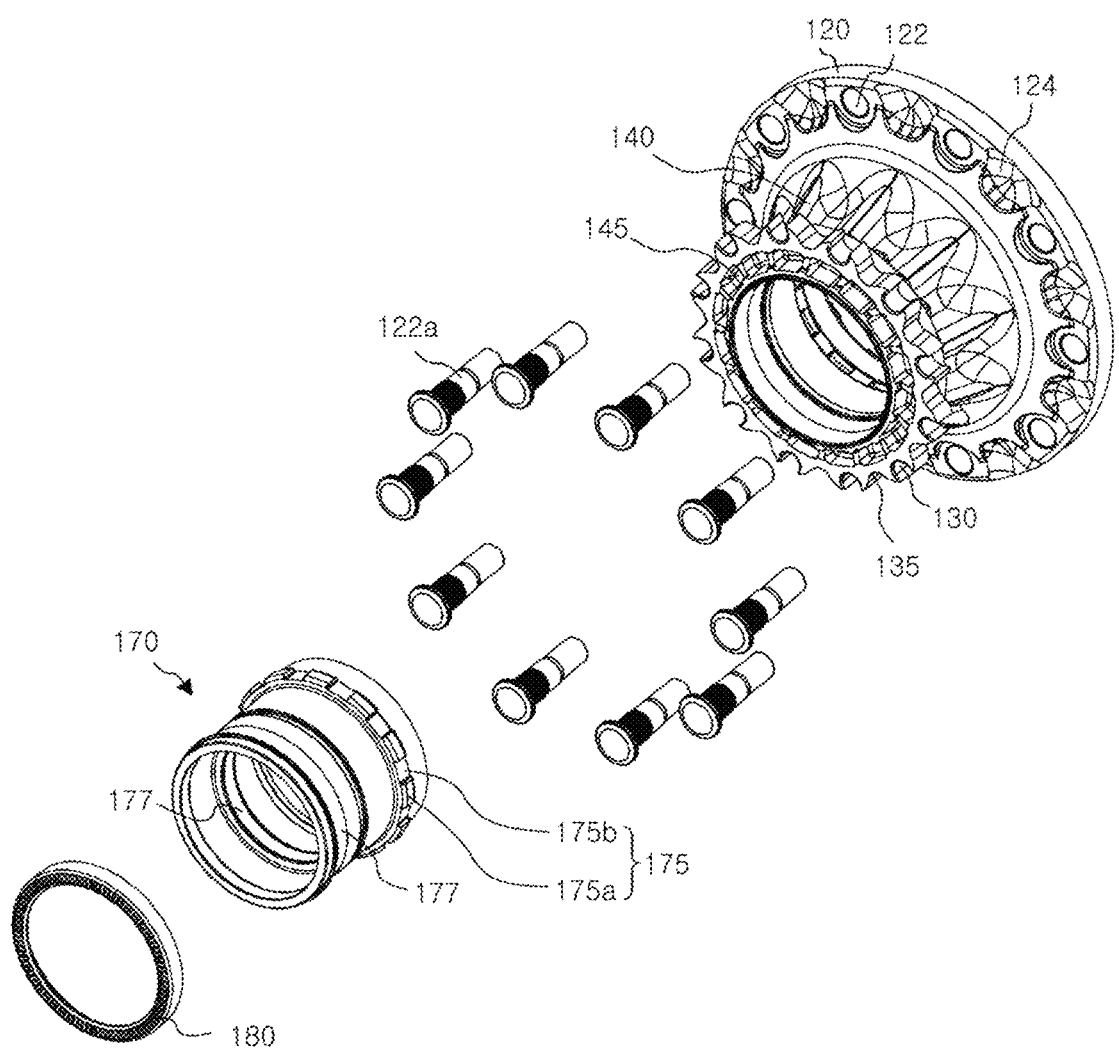
FIG. 4 is an exploded view of the hub portion of FIG. 3.
Figure 5:
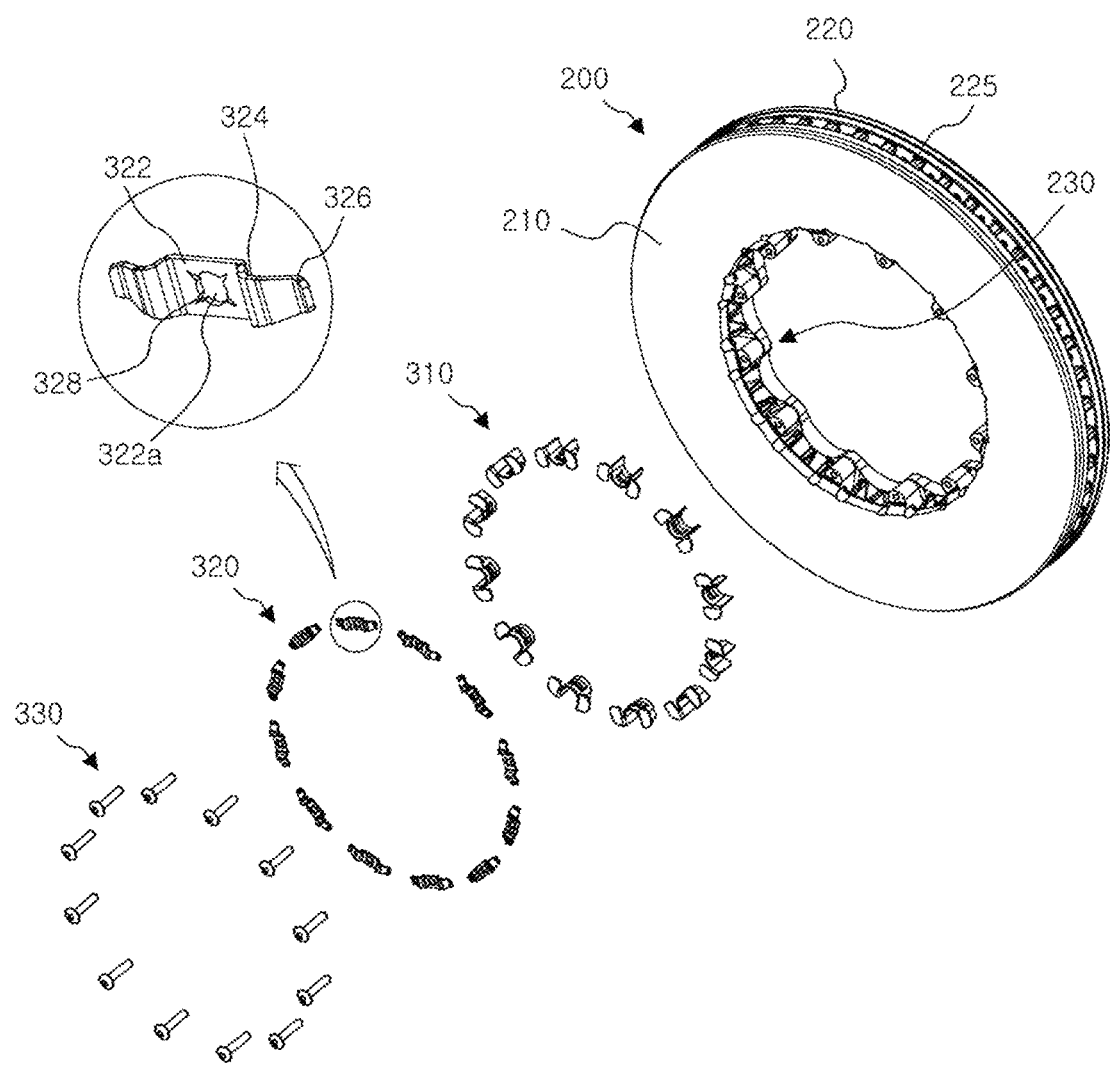
FIG. 5 is an exploded view of a fastening member in the disc portion of FIG. 3.

In addition, FIG. 3 is an exploded view of a hub portion and a disc portion of the vehicle floating disc hub assembly of FIG. 1, FIG. 4 is an exploded view of the hub portion of FIG. 3, and FIG. 5 is an exploded view of a fastening member in the disc portion of FIG. 3.

Figure 6A:
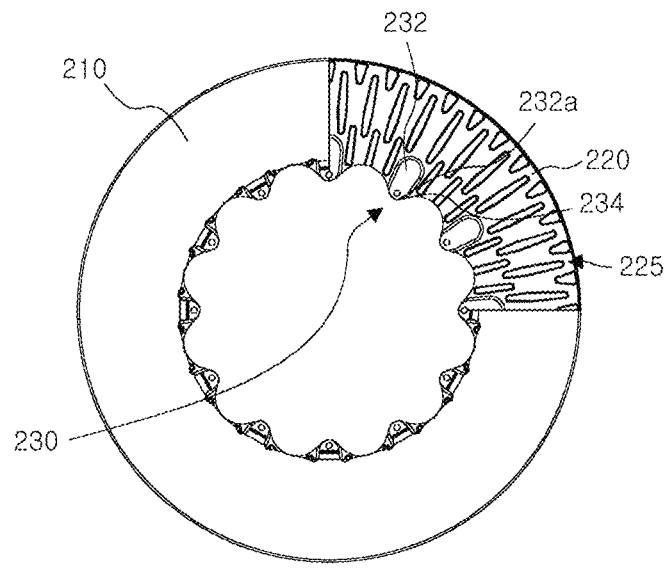
FIG. 6A is a view illustrating a disc portion having a vane structure.
Figure 6B:
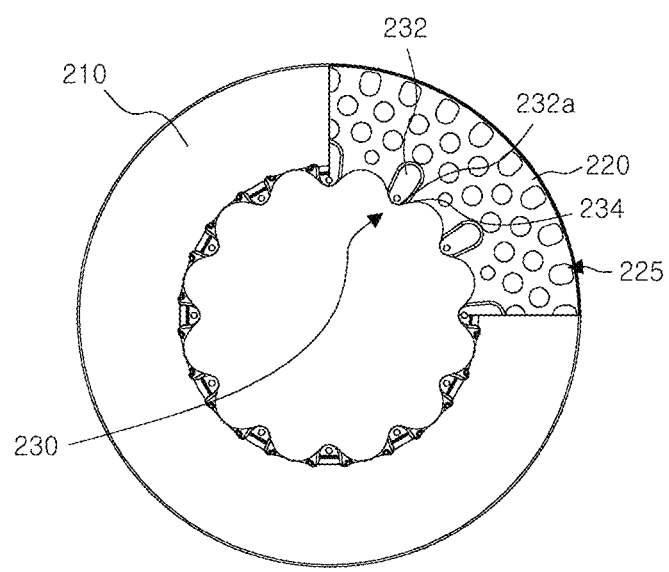
FIG. 6B is a view illustrating a disc portion having a spot structure.
Figure 7:
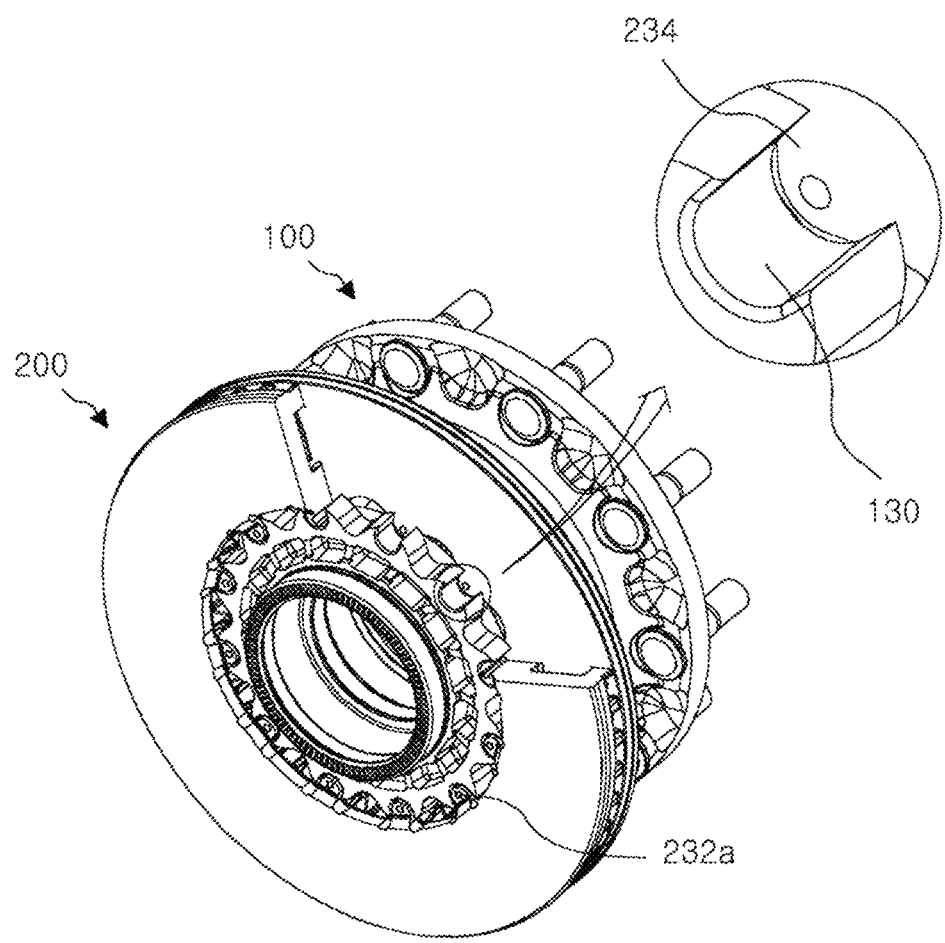
FIG. 7 is a view illustrating an action of a positioning surface by cutting the disc portion.

In addition, FIG. 6A is a view illustrating a disc portion having a vane structure, FIG. 6B is a view illustrating a disc portion having a spot structure, FIG. 7 is a view illustrating an action of a positioning surface by cutting the disc portion, and FIGS. 8A to 8F are views illustrating an example of an assembly process of a vehicle floating disc hub assembly according to an embodiment of the present disclosure.

Figure 9:
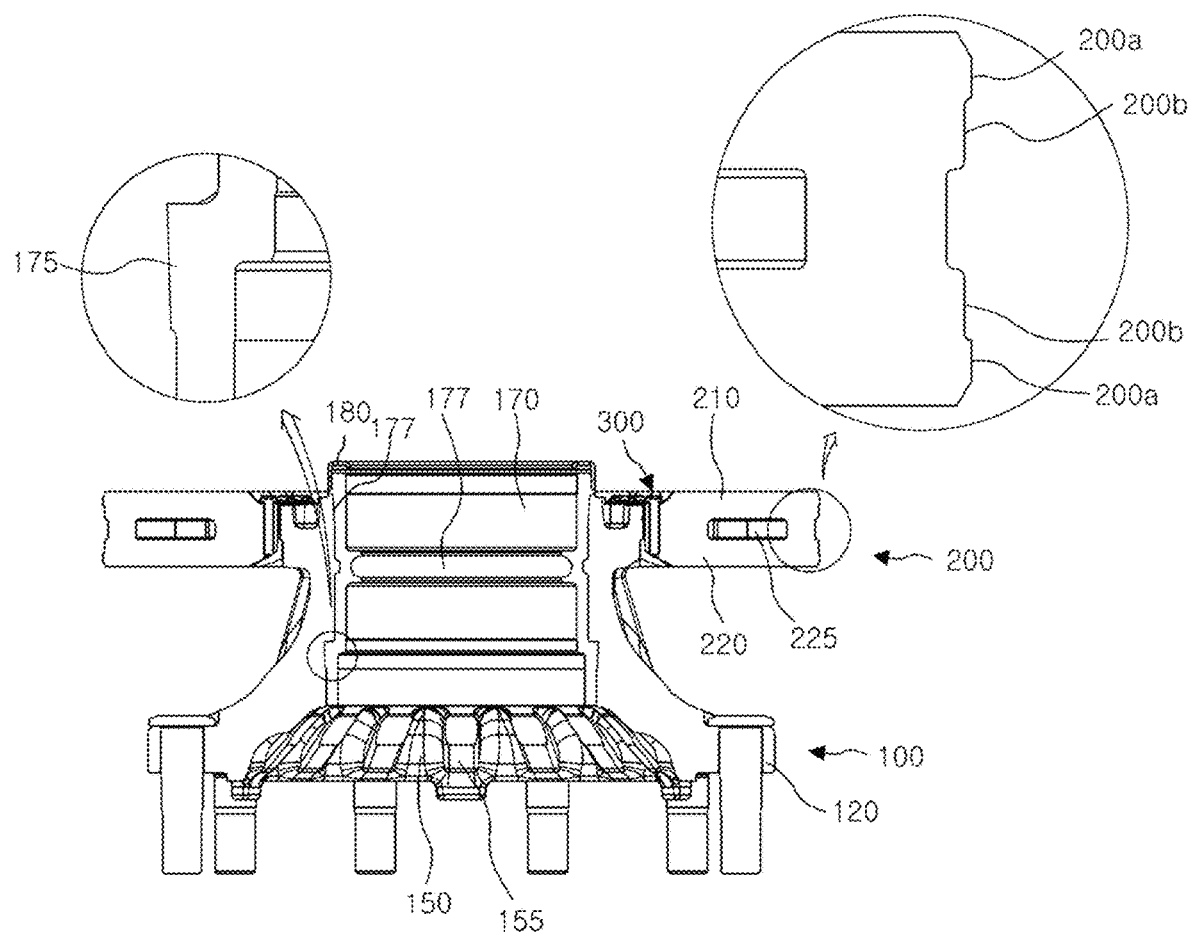
FIG. 9 is a cross-sectional view taken along a line A-A' of FIG. 1.
Figure 10A:
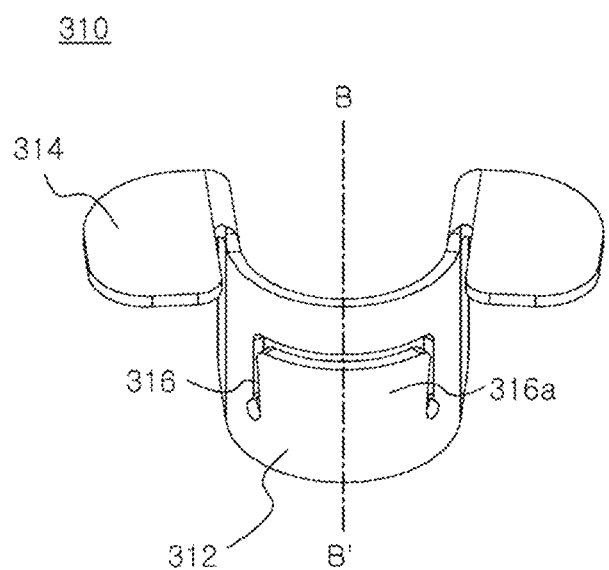
FIG. 10A is a detailed view of a spring clip which is one configuration of the fastening member of FIG. 5.
Figure 10B:
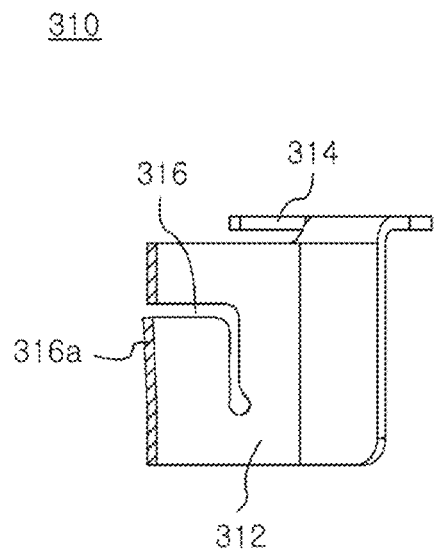
FIG. 10B is a cross-sectional view taken along a line B-B' of FIG. 10A.
Figure 11:
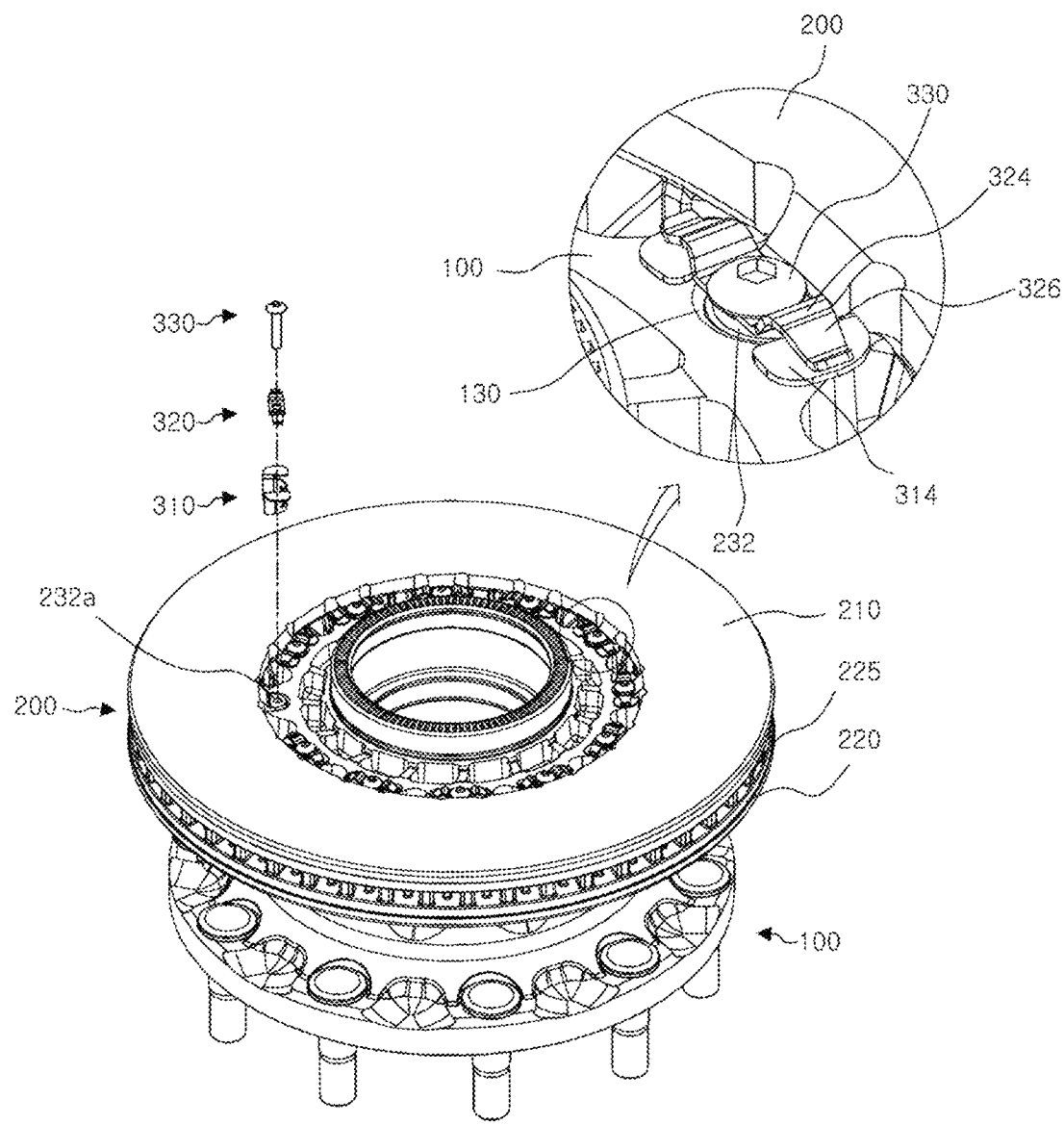
FIG. 11 is a view illustrating in detail fastening of the hub portion and the disc portion.

In addition, FIG. 9 is a cross-sectional view taken along a line A-A' of FIG. 1, FIG. 10A is a detailed view of a spring clip which is one configuration of the fastening member of FIG. 5, FIG. 10B is a cross-sectional view taken along a line B-B' of FIG. 10A, and FIG. 11 is a view illustrating in detail fastening of the hub portion and the disc portion.

Referring to FIGS. 1 to 11, the vehicle floating disc hub assembly according to the embodiment of the present disclosure may be configured to include a hub portion 100 and a disc portion 200 mounted in the hub portion 100 through a fastening member 300.

Specifically, the hub portion 100 is a connector connecting the disc portion 200 to an axle (not illustrated) of a vehicle and is formed with a hollow portion 110 to have an outer circumferential surface and an inner circumferential surface, and the axle may be combined with the hollow portion 110. At this time, the axle is preferably coupled to a bearing (not illustrated) and may be mounted on the hollow portion 110 because the axle has to be rotated by a wheel, and it is possible to prevent the bearing (not illustrated) from being directly rubbed with the hub portion 100 by a bearing housing 170.

That is, the bearing housing 170 is mounted in the hollow portion 110 of the hub portion 100, and the bearing coupled with the axle is mounted therein. In addition, one end portion of the bearing housing 170 protrudes from the hub portion 100 such that a pulse ring 180 may be mounted thereon, and in order not to deviate from the hollow portion 110 of the hub portion 100a, serration portions 175 configured by protrusions 175a and grooves 175b are formed to be capable of engaging the inner circumferential surface of the hub portion 100.

Here, the pulse ring 180 has a common configuration for sensing rotation of a wheel by using an ABS sensor, and detailed description thereof will be omitted, and detailed description on mounting of the bearing housing 170 through the serration portion 175 will be described below.

Meanwhile, the bearing housing 170 may be made of spheroidal graphite cast iron such as FCD500 and is illustrative and not limited and may be made of another material. However, for the sake of easy heat dissipation, the bearing housing is preferably made of a material different from a material of the hub portion 100 in thermal expansion coefficient, which will be described in detail below later when describing the material of the hub portion 100.

A flange portion 120 may be provided in one end of the hub portion 100 in an axial direction. The flange portion 120 has a space in which stud bolts 122a for coupling to a wheel or the like of a vehicle are fastened, and a plurality of bolt fastening holes 122 to be fastened with the stud bolts 122a in a circumferential direction are formed at regular intervals.

Here, the flange portion 120 is preferably formed to have a thickness of 22 T to 30 T, and this is an example and is not limited, and may be formed in excess or below a range depending on a material to be formed and intention of an operator.

In addition, the flange portion 120 may have a plurality of first flange grooves 124 that are formed to have a predetermined depth along a circumference on one side in a direction in which the stud bolt 122a is inserted, and a plurality of second flange grooves 126 that are formed to have a predetermined depth along a circumference on the other side.

Here, the first flange grooves 124 and the second flange grooves 126 are formed to reduce a weight and to increase an air contact area, and although the grooves are illustrated in the drawing as being formed in a uniform shape between the bolt fastening holes 122, this is an example, and the grooves are not limited to the positions, the shapes, and the areas and may be formed to have other positions, other shapes, and other areas depending on the intention of an operator in consideration of weight reduction, rigidity, and the like.

Disc fastening grooves 130 for fastening with the disc portion 200 may be formed at the other end of the hub portion 100 in an axial direction. A plurality of the disc fastening grooves 130 may be formed at regular intervals along a circumference of an outer circumferential surface of the hub portion 100.

At this time, the disc fastening grooves 130 may be formed to be opened in a direction of the outer circumferential surface of the hub portion 100 to have a floating structure which is characteristics of the present disclosure. That is, when viewed from a front, the disc fastening grooves 130 may be an arc formed to have a length of a predetermined angle or an "U" shape.

Here, the floating structure is a structure in which thermal expansion of the disc portion 200 assembled to the hub portion 100 is free, and the disc portion 200 may expand freely to an open space of the disc fastening grooves 130 during thermal expansion as described above. More detailed description of the floating structure will be described below.

In addition, the hub portion 100 may have a shape in which an outer diameter gradually expands from the disc fastening grooves 130 to the flange portion 120, and a first plurality of straight ribs 140 may be formed along an outer circumferential surface between the disc fastening grooves 130 and the flange portion 120.

The straight ribs 140 may guide air flowing to the outer circumferential surface of the hub portion 100 in a straight direction while reinforcing rigidity of the hub portion 100, and at this time, in order to smoothly discharge the flowing air, air outlets 145 may be formed in the other direction of the flange portion 120 forming the largest diameter in the hub portion 100, that is, in a direction in which the disc fastening grooves 130 are formed.

That is, when the air outlets 145 are formed, as illustrated in the drawing, the hub portion 100 may have a shape in which the other end thereof is surrounded by the air outlets 145 and a plurality of disc fastening grooves 130 are formed at regular intervals along a circumference in which the air outlets 145 are formed.

When the assembled disc portion 200 or the fastening member 300 is heated, the hub portion 100 having the external structure may rapidly reduce a temperature of the disc portion 200 by discharging air through the air outlets 145 while guiding the air through the straight ribs 140 or gaps between the ribs 140.

Meanwhile, although the air outlets 145 are illustrated as being several pieces in the drawing, the air outlets may be provided in plural. That is, the number of the air outlets 145 are two or more and may be provided in a smaller number by making lengths thereof longer than the lengths illustrated in the drawing, or, conversely, in a greater number by making the lengths shorter than the lengths illustrated in the drawing.

In addition, the hub portion 100 may also have a dent portion 150 formed by denting an inner circumferential surface of the flange portion 120 by a predetermined depth in an axial direction. The dent portion 150 serves to increase heat dissipation by reducing a weight of the hub portion 100 and sufficiently increasing an area in contact with air on the inner circumferential surface.

At this time, a second plurality of straight ribs 155 connected to the flange portion 120 along a circumference of the dent portion 150 may be formed to reinforce rigidity due to formation of the dent portion 150 and to guide the air.

In addition, the hub portion 100 may be made of an aluminum material and may be preferably made of an A356 material that is effective in tensile strength, cooling performance, weight reduction, thermal conductivity, and the like and is not limited thereto, and may be made of various materials.

The hub portion 100 described above may have a structure that reduces a weight materially and geometrically, a large area in contact with air, and a space through which air flows, thus, effectively dissipating heat during braking.

In addition, when the hub portion 100 is made of an aluminum material, the aluminum material has a difference in thermal conductivity from the bearing housing 170 made of spheroidal graphite cast iron, and the like, which is a structure in which heat may be easily conducted from the bearing housing 170 and serves to increase cooling performance of the bearing housing 170 by quickly receiving heat of the bearing housing 170 generated by rotation of an axle and by discharging the heat to the outside.

In particular, when a bearing directly rubs against the hub portion 100, the bearing is severely worn due to frictional heat of the bearing generated by motion and load generated during driving of a vehicle, and thus, a gap may occur between the bearing and the hub portion 100 which may cause a phenomenon in which the bearing rotates in vain, and in this case, by providing the bearing housing 170 made of a different material, a thermal expansion coefficient may be reduced and the above-described problem may be solved.

The disc portion 200 is a member that is equipped with a brake caliper (not illustrated) to pressurize a wheel of a vehicle to stop rotation thereof, and may include a hub fastener 230 corresponding to the disc fastening groove 130 to be mounted on the hub portion 100 through the fastening member 300.

Specifically, the disc portion 200 may be configured to include a first disc 210, a second disc 220, a ventilation portion 225, and hub fasteners 230.

Here, the first disc 210 and the second disc 220 each has inner hollow shapes and the same members forming an outer circumferential surface and an inner circumferential surface of the same diameter and are symmetrical, and the ventilation portion 225 and the hub fasteners 230 may be provided between the first disc 210 and the second disc 220.

That is, the disc portion 200 has a structure in which the first disc 210, the ventilation portion 225, the hub fasteners 230, and the second disc 220 are sequentially formed, and the first disc 210, the ventilation portion 225, the hub fasteners 230, and the second disc 220 may be integrally made by using a casting method such as sand mold casting.

At this time, the ventilation portion 225 may have a structure capable of flowing air by providing a rib arrangement formed in a vane structure as illustrated in FIG. 6A or in a spot shape as illustrated in FIG. 6B, and in addition to this, as long as a structure is capable of flowing air, the ventilation portion may use any structure without limitation.

The hub fastener 230 is a member that is inserted into the disc fastening groove 130 of the hub portion 100 and may be configured to include insertion portions 232 and a positioning surface 234.

Specifically, a plurality of insertion portions 232 may be formed to protrude toward an inner circumference along an inner circumferential surface of the disc portion 200. That is, the insertion portions 232 are between the first disc 210 and the second disc 220 and have lengths that protrude toward the inner circumferential surface of the disc portion 200 and are formed to have a uniform space along a circumference of the disc portion 200.

The positioning surface 234 may be formed on both sides of an end portion with respect to the other side, in an insertion direction of the fastening bolt 330 that will be described below, of a protruding end 232a of the insertion portion 232 which protrudes onto the inner circumferential surface of the disc portion 200. At this time, the positioning surface 234 may be formed to have an extended area to form a larger area than an area of the disc fastening groove 130.

That is, the hub fastener 230 forms an area where the protruding end 232a of the insertion portion 232 is inserted into the disc fastening groove 130 and forms an area such that the positioning surface 234 is not inserted more than the disc fastening groove 130, and when the hub fastener 230 is inserted into the disc fastening groove 130 in the axial direction of the axle, the protruding end 232a of the insertion portion 232 is inserted, and as illustrated in FIG. 7, when reaching the positioning surface 234, insertion of the insertion portion 232 is stopped such that the insertion portion 232 is in line with the disc fastening groove 130 without passing through the disc fastening groove 130.

That is, the positioning surface 234 determines an axial position of the disc portion 200 with respect to the hub portion 100, and serves as an auxiliary member that prevents deviation in one axial direction after being assembled with the fastening member 300.

Meanwhile, during assembly of the disc portion 200 and the hub portion 100, the disc portion 200 may be pushed from an outside direction to fit onto the hub portion 100, but preferably, the disc portion 200 may be mounted by pulling the disc portion 200 from the hub portion 100 side to facilitate the mounting of the fastening member 300.

To this end, disc through-holes 135 having areas through which the positioning surfaces 234 may pass may be further formed between the disc fastening grooves 130, and hub through-holes 235 having areas through which the disc fastening grooves 130 may pass could be further formed between the hub fasteners 230.

Figure 8A:
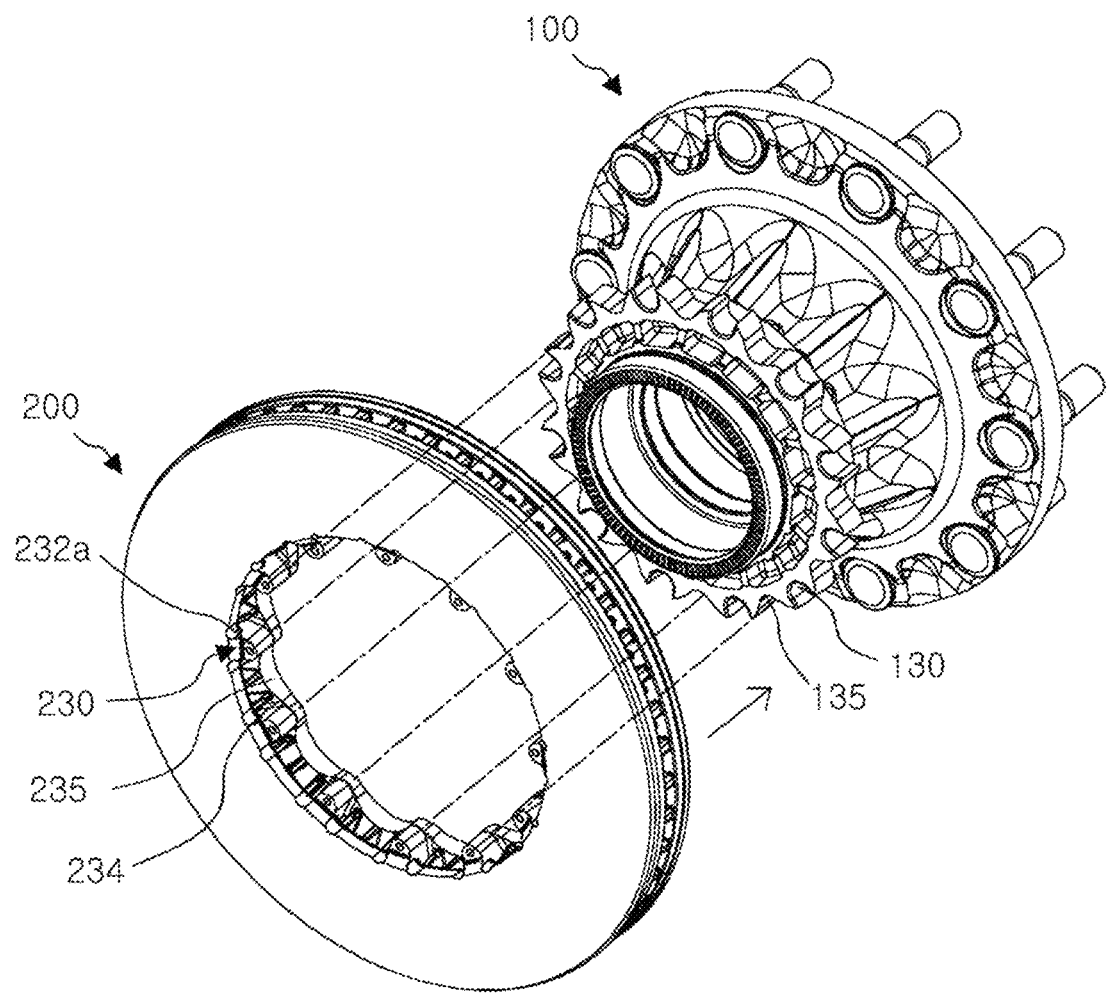
FIGS. 8A to 8F are views illustrating an example of an assembly process of a vehicle floating disc hub assembly according to an embodiment of the present disclosure.
Figure 8B:
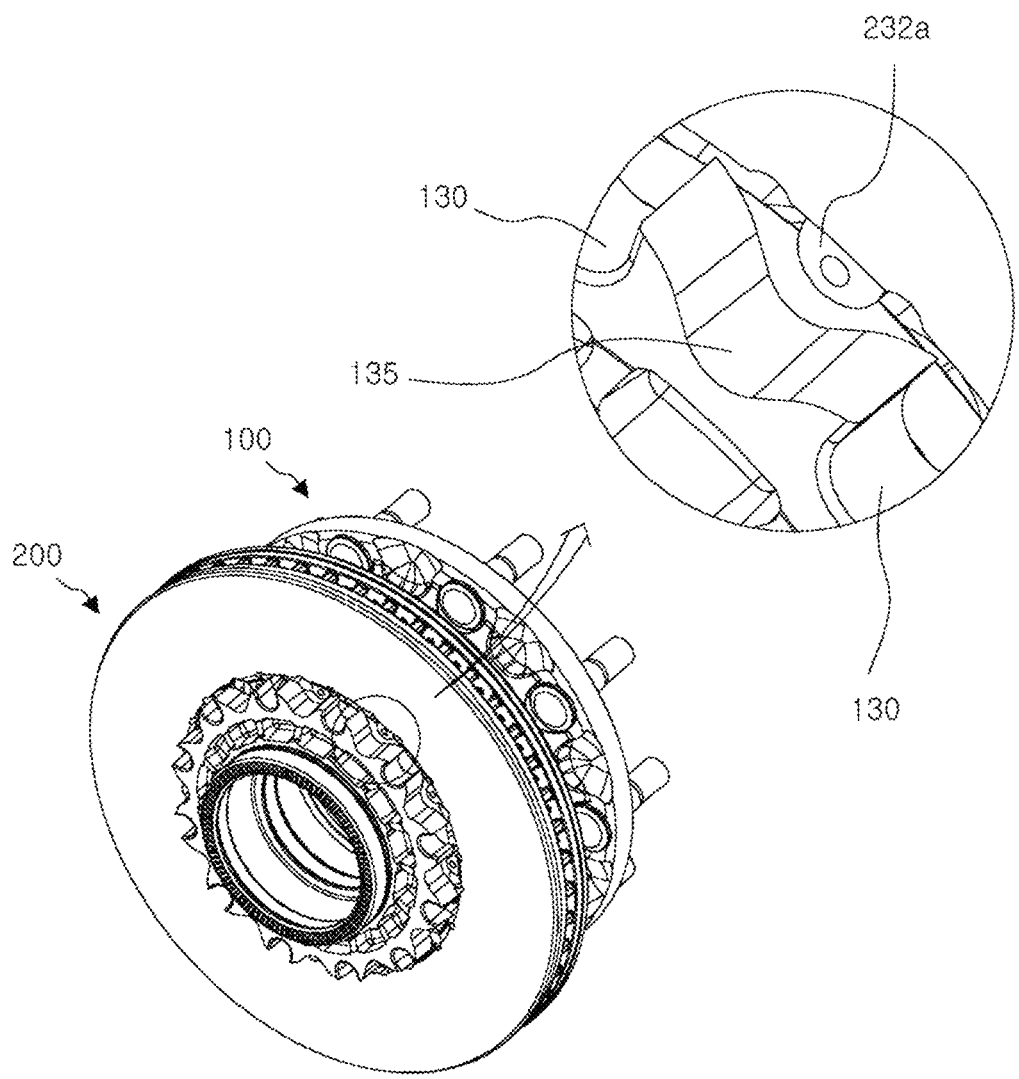
Figure 8C:
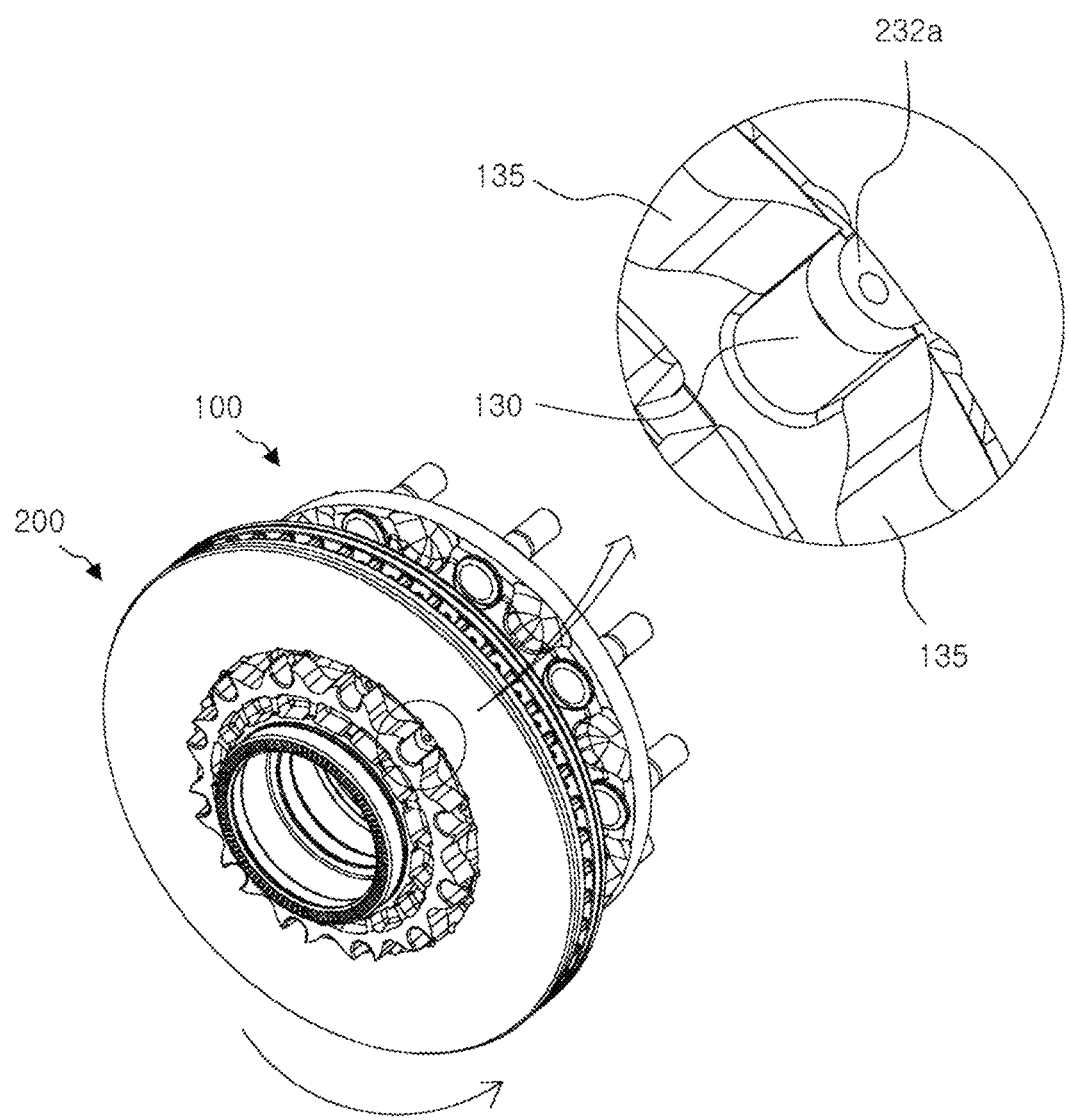
Figure 8D:
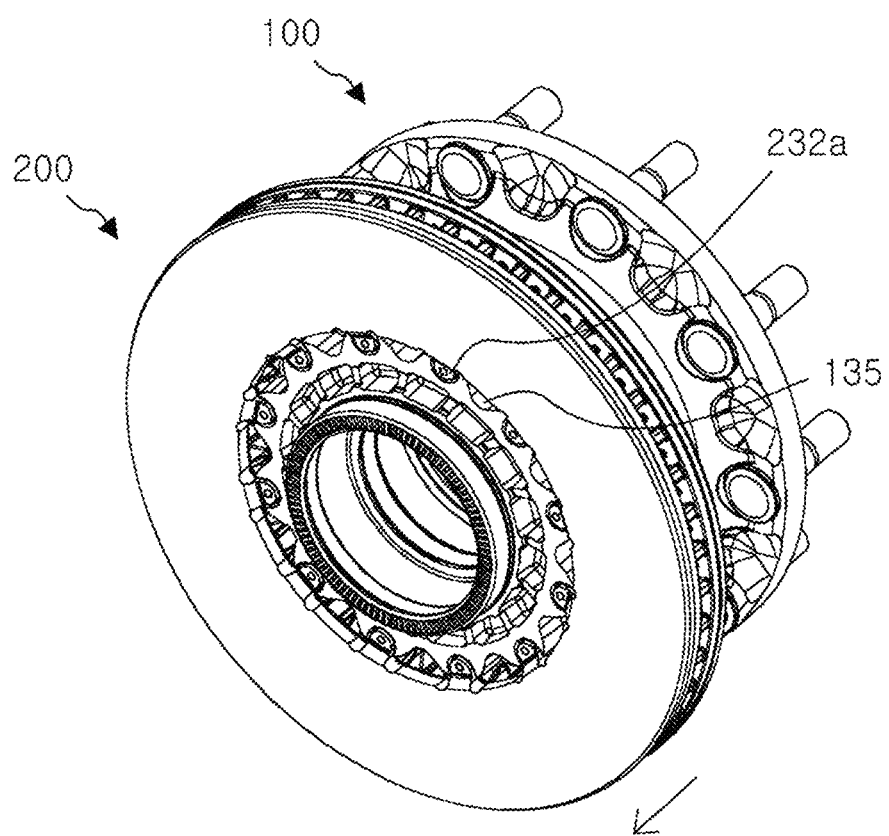
Figure 8E:
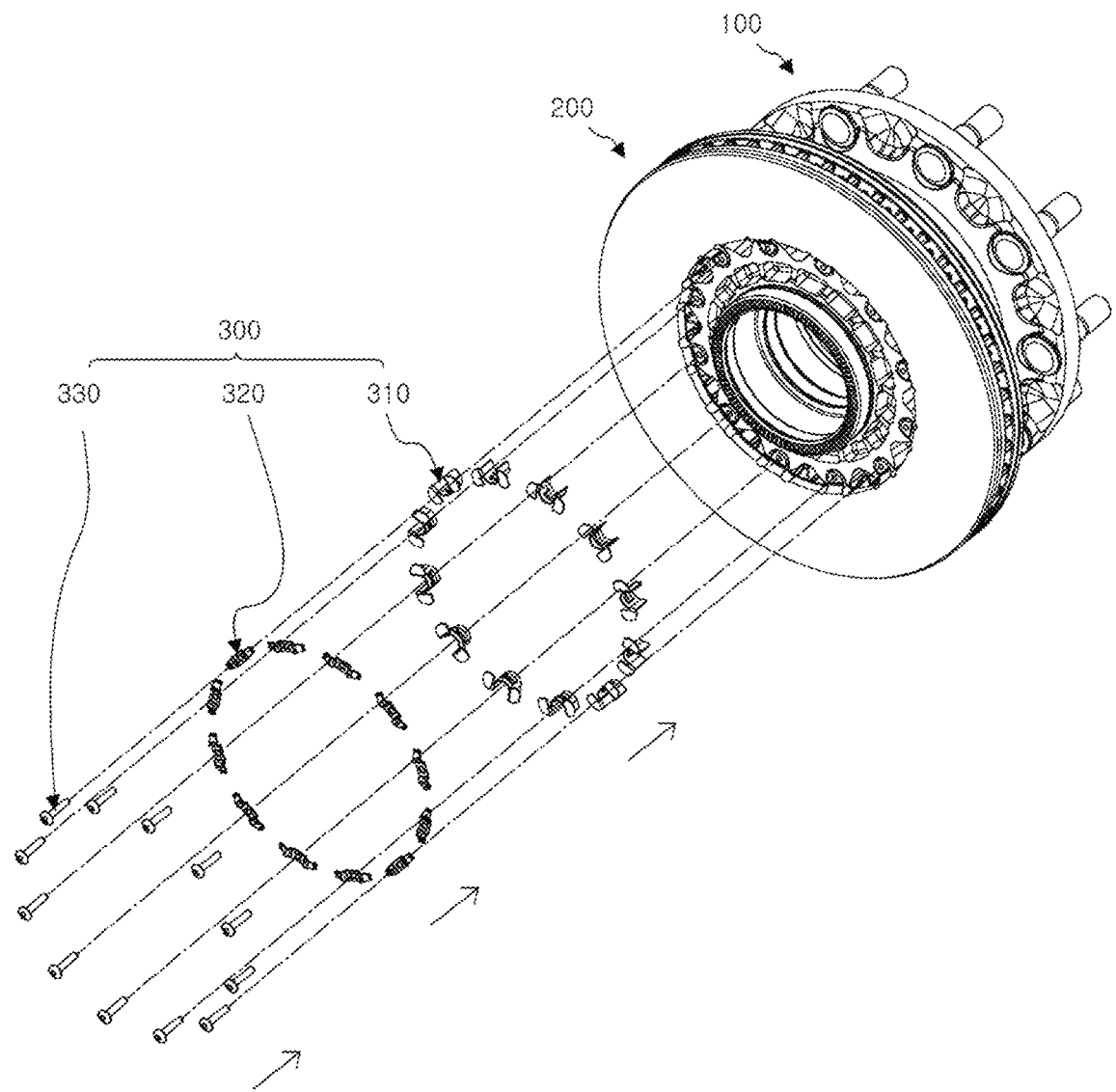
Figure 8F:
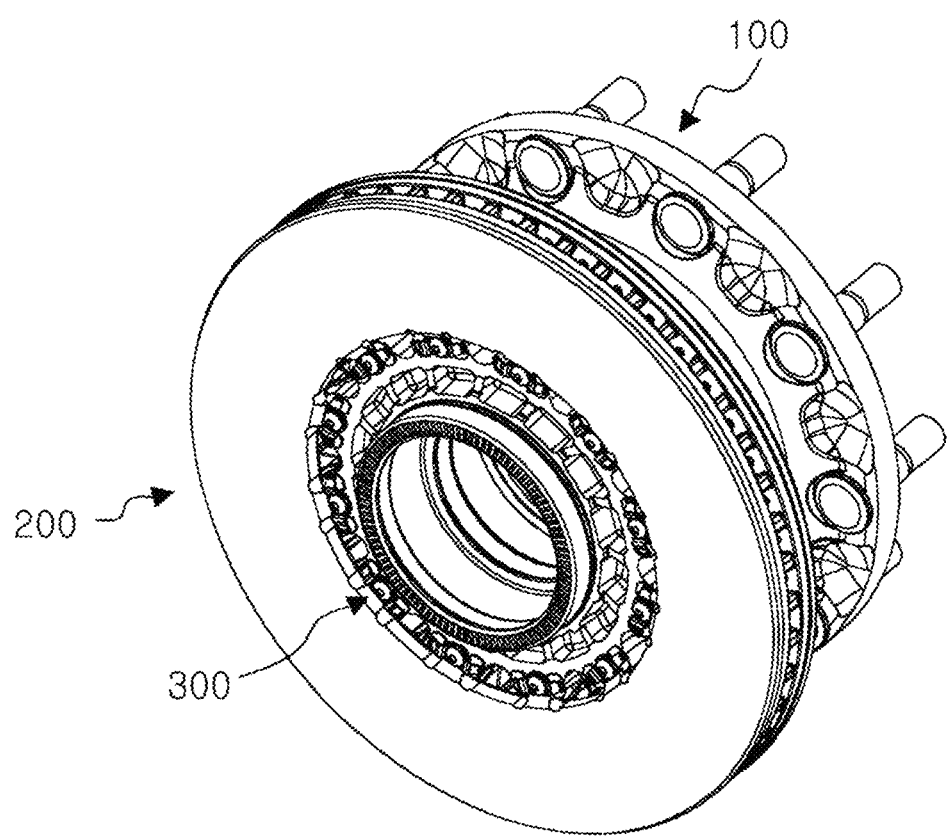

Through this, when the disc portion 200 is mounted in the hub portion 100, a direction of the disc portion 200 is adjusted such that the positioning surfaces 234 passes through the disc through-holes 135 earlier than the insertion portion 232 as illustrated in FIGS. 8A and 8B. Thereafter, the hub portion 100 is rotated on the circumference such that the hub fastener 230 faces the disc fastening groove 130 on the same axis as illustrated in FIG. 8C, the disc portion 200 is pulled so as to be inserted into the hub fastener 230 as illustrated in FIG. 8D, the disc portion 200 is coupled through the fastening member 300 as illustrated in FIG. 8E, and mounting may be completed as illustrated in FIG. 8F.

A mounting structure of the disc portion 200 is a structure in which the fastening member 300 has to be fastened in the other direction in which the positioning surface 234 is formed, and the fastening member 300 may fit as it is from the outside without being mounted between the hub portion 100 and the disc portion 200, and thus, assembly is easily made.

Here, the disc through-hole 135 and the hub through-hole 235 are not only for pass-through of the positioning surface 234 and the disc fastening groove 130, but also for dispersion of stress occurring between the disc fastening groove 130 and the hub fastener 230, and preferably coincide with an outer diameter of the disc fastening groove 130.

The disc portion 200 may be made of a material different from the hub portion 100 like the bearing housing 170 and may be preferably made of spherical graphite cast iron such as FC210D having a difference in thermal conductivity from the hub portion 100.

During braking, heat generated from the disc portion 200 is not only discharged to the outside through the ventilation portion 225 but also easily conducted to the hub portion 100 having a difference in thermal conductivity in the same principle that the bearing housing 170 conducts heat to the hub portion 100, and then, the heat is discharged through the air outlet 145 or the like of the hub portion 100, thus, increasing cooling performance of the disc portion 200 resulting in preventing deterioration and cracking.

That is, the present disclosure has excellent cooling performance in that heat is more quickly conducted from the disc portion 200 and the bearing housing 170 made of spheroidal graphite cast iron around the hub portion 100 made of an aluminum material and is discharged through the hub portion 100.

In addition, the disc portion 200 may also be formed such that an inner side portion 200*b* of a circumferential surface has a step difference of a deeper depth than an outer side portion 200*a* of the circumferential surface in a centrifugal direction as illustrated in FIG. 9. That is, when viewed in the form of a regular cross-section, the outer portion 200*a* of the circumferential surface may protrude more, which saves a weight except for the outer portion 200*a* of the circumferential surface in which a brake pad is pressurized during braking and has an advantage in that an air contact area of the outer portion 200*a* of the circumferential surface involved in braking is widened such that heat may be quickly discharged to the outside.

Meanwhile, as described above, the disc portion 200 mounted to the hub portion 100 may be fixed by the fastening member 300, and the fastening member 300 may be configured to include a spring clip 310, a spring plate 320, and a fastening bolt 330.

Here, the spring clip 310 may be provided between the disc fastening groove 130 and the hub fastener 230 to form a contact force with the disc fastening groove 130 and the hub fastener 230. That is, the disc fastening groove 130 and the hub fastener 230 may force to fit together when the disc portion 200 is mounted on the hub portion 100, but a gap may be made due to formation of a tolerance or the like for ease of assembly and this gap is filled with a spring clip 310 so as to preferably have a solid fixing force.

The spring clip 310 for this may be configured to include a clip body 312, a bent portion 314, and a clip cutting portion 316.

Specifically, the clip body 312 is mounted between the disc fastening groove 130 and the hub fastener 230 and is formed to correspond to a shape between the disc fastening groove 130 and the hub fastener 230, and the clip body 312 may also form a cross-section of a "U" shape due to a structure of the disc fastening groove 130 that forms an arc having a length corresponding to a predetermined angle, a "U" shape, and the like, and the hub fastener 230 corresponding thereto, At this time, the clip body 312 may form a height in the form of a "U"-shaped cross-section and may preferably form a height as high as a height of the disc fastening groove 130 or the hub fastener 230, but is limited thereto, and the clip body 312 may be set to be lower or higher than the heights of the disc fastening groove 130 and the hub fastener 230 according to adjustment of an axial elastic force of the disc portion 200.

The bent portion 314 may be bent in an outward direction from one side of both end portions of the clip body 312 to form a placing surface of the spring plate 320. That is, the bent portion 314 may be formed vertically with the clip body 312 as illustrated in the drawing, and at this time, when a height of the clip body 312 coincides with a height of the disc fastening groove 130, it is possible to form a structure in which the bent portion 314 is supported to an end portion of the disc fastening groove 130.

The clip cutting portion 316 is formed to be cut in a "u" shape at the center of the clip body 312 and may provide an elastic force to the clip body 312 in a vertical direction. That is, elasticity or thermal expansion in the axial direction may be more flexible due to the formation of the clip cutting portion 316.

At this time, the clip body 312 may have a cutting surface 316*a* of a "⊔" shape formed inside the clip cutting portion 316 due to the formation of the clip cutting portion 316, and the cutting surface 316*a* may be bent forward at a predetermined angle such that the disc portion 200 to be mounted may have an elastic force in a centrifugal direction or a direction opposite to the centrifugal direction.

The spring plate 320 is provided such that the disc portion 200 has an elastic force or thermal expansion flexibility in an axial direction and may be formed to be placed in the spring clip 310 and may be configured to include a base portion 322, a wing portion 324, a contact portion 326, and a plate cutting portion 328 to this end.

Specifically, the base portion 322 may be formed in a plate shape and have a bolt through-hole 322*a* formed at the center. As will be described below, the fastening bolt 330 which prevents deviation by fixing the spring plate 320 may pass through the bolt through-hole 322*a*.

The wing portion 324 may be formed to extend in a "∧" shape at both ends of the base portion 322, and the contact portion 326 may be formed to extend in a "v" shape at the wing portion 324 to be placed in the bent portion 314 of the spring clip 310.

The spring plate 320 may provide an elastic force or thermal expansion flexibility in the axial direction due to the shapes of the wing portion 324 and the contact portion 326, and heights of the wing portion 324 and the contact portion 326 may also be set differently to adjust an elasticity range.

The plate cutting portion 328 is formed to be cut in some directions from the bolt through-hole 322*a* to facilitate insertion of the fastening bolt 330 and to reduce friction with the fastening bolt 330, and thus, generation of stress is reduced and heat is dispersed.

The spring clip 310 and the spring plate 320 may be made of a carbon tool steel material such as SK5 by press working, which is an example, and the material and a processing method are not limited and may be formed differently.

In addition, the fastening bolt 330 may be coupled to the hub fastener 230 by making an end portion thereof pass through the bolt through-hole 322a of the spring plate 320 and fix the spring clip 310 and the spring plate 320 to prevent from being deviated.

Hereinafter, mounting of the bearing housing 170 onto the hub portion 100 and a method of manufacturing the disc portion 200 will be described with reference to FIGS. 12 to 14.

Figure 12:
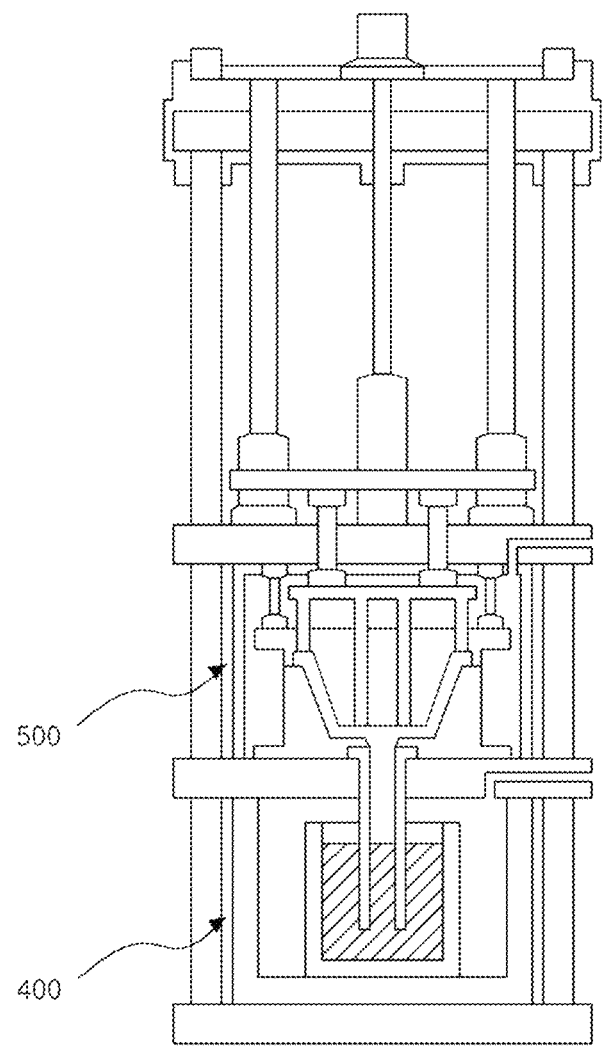
FIGS. 12 to 14 are views illustrating a method of inserting a bearing housing into the hub portion and a method of manufacturing the disc portion.
Figure 13:
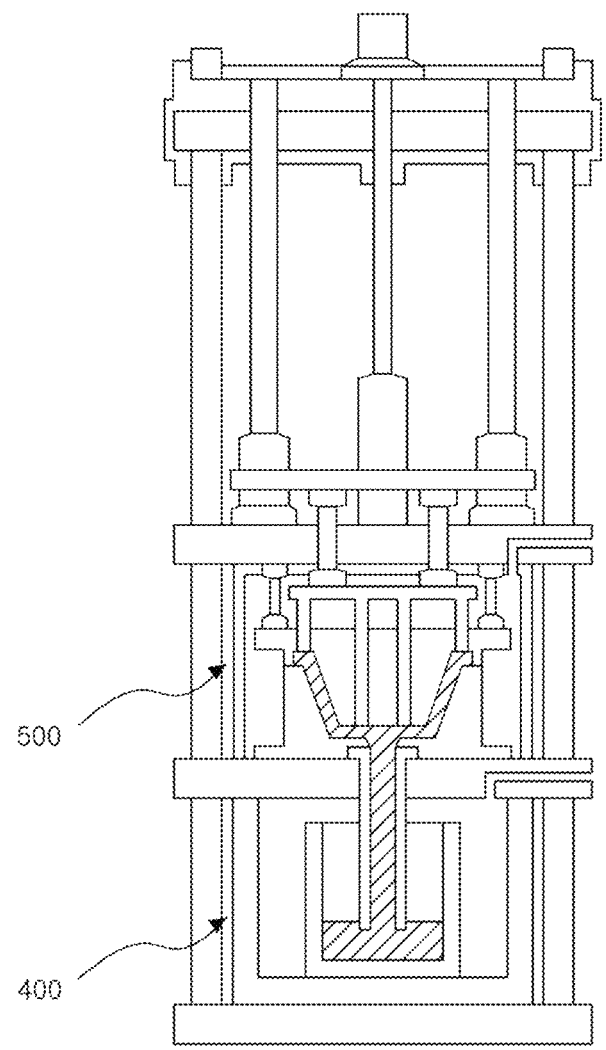
Figure 14:
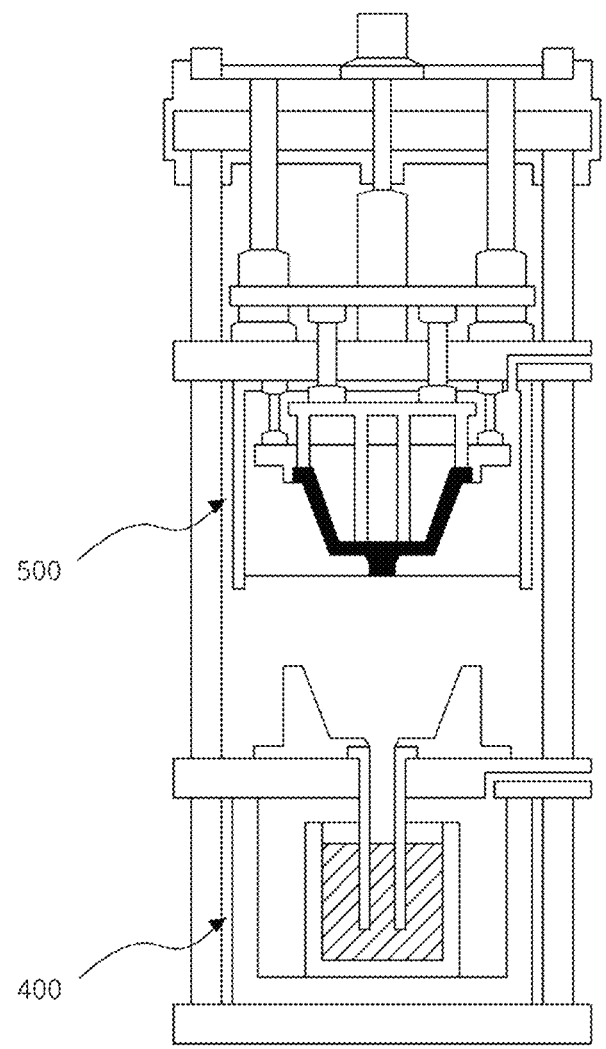

FIGS. 12 to 14 are views illustrating a method of inserting the bearing housing into the hub portion and the method of manufacturing the disc portion.

Referring to FIGS. 12 to 14, the hub portion 100 and the bearing housing 170 may be manufactured independently and assembled to the hub portion 100, but preferably, may be inserted into the hub portion 100 to prevent deviation when the hub portion 100 is manufactured.

Specifically, the hub portion 100 may be integrally formed with the bearing housing 170 through a differential pressure casting method after the bearing housing 170 is manufactured through a method such as sand mold casting and inserted into a hub mold.

A differential pressure casting apparatus using the differential pressure casting method may include a mold portion chamber 500 installed at an upper portion thereof, and a temperature control furnace 400 installed at a lower portion thereof, and the temperature control furnace 400 may contain or may generate a molten material obtained by melting a material to be used for casting.

The differential pressure casting apparatus may be formed such that a material melted in the temperature control furnace 400 due to a pressure difference between the mold portion chamber 500 and the temperature control furnace 400 is supplied to the mold portion chamber 500 to be molded.

In the differential pressure casting apparatus illustrated in FIG. 12, the bearing housing 170 previously manufactured may be fixed to the mold portion chamber 500 including a hub mold, and then, the mold portion chamber 500 and the temperature control furnace 400 of the differential pressure casting apparatus may be pressurized to have the same pressure. the mold portion chamber 500 and the temperature control furnace 400 may be maintained at the same internal pressure.

Subsequently, as illustrated in FIG. 13, a pressure of the mold portion chamber 500 may be increased. Accordingly, the molten material melted in the temperature control furnace 400 due to a pressure difference between the mold portion chamber 500 and the temperature control furnace 400 may be supplied to the mold portion chamber 500.

As described above, when a pressure of the mold portion chamber 500 increases and the molten metal flows into a mold of the mold portion chamber 500, air bubbles are significantly reduced compared to a general casting method. In addition, the hub portion 100 may have uniform physical properties because there is little variation in physical properties.

Thereafter, as illustrated in FIG. 14, when AL356 or the like which is a molten material is completely solidified in the mold portion chamber 500 and thereafter the hub portion 100 is extracted by separating the mold portion chamber 500, the hub portion 100 and the bearing housing 170 may be integrated.

At this time, the hub portion 100 and the bearing housing 170 form the serration portions 175 in which the protrusions 175a and the grooves 175b are alternately formed to be engaged as illustrated in FIGS. 3 and 9. Due to this, a circumferential rotation and a deviation in an axial direction may be prevented.

Here, the serration portion 175 may be formed as one piece or in a plurality of pieces, and when the plurality of serration portions 175 are formed, the serrations portions 175 may be provided along a height of the bearing housing 170.

In addition, the bearing housing 170 may also have an outer circumferential surface or an inner circumferential surface excluding the serration portion 175 provided in a plane along a height thereof, and may also preferably form one or more step difference portions 177 having different depths. Here, the step difference portions 177 may have an effect of increasing a fixing force with the hub portion 100 while reducing a weight of the bearing housing 170.

Meanwhile, the integral structure of the hub portion 100 and the bearing housing 170 is described by using a preferred differential pressure casting method as an example but may be formed in a method different from the differential pressure casting method. For example, a molten material forging method or a low-pressure casting method may be used. However, these methods are not limited, and other casting methods may be used.

The disc portion 200 may also be manufactured by using the methods illustrated in FIGS. 12 to 14.

That is, as illustrated in FIG. 12, the first and second discs 210 and 220 previously manufactured and coupled to a differential pressure casting apparatus may be fixed to the mold portion chamber 500. Subsequently, the mold portion chamber 500 of the differential pressure casting apparatus and the temperature control furnace 400 are pressurized to have the same pressure. At this time, internal pressures of the mold portion chamber 500 and the temperature control furnace 400 may be maintained to be equal.

Subsequently, as illustrated in FIG. 13, a pressure of the mold portion chamber 500 is increased to form a pressure difference between the mold portion chamber 500 and the temperature control furnace 400, and the molten material melted in the temperature control furnace 400 due to the pressure difference is supplied to the mold portion chamber 500. At this time, the molten material may be supplied to the mold portion chamber 500 through a space between the first and second discs 210 and 220.

As described above, when the molten material is introduced due to the increased pressure of the mold portion chamber 500, air bubbles are significantly reduced compared to the general casting method and a variation in physical properties may be reduced.

As the disc portion 200 has uniform physical properties, heat generated during an operation of a brake or rotation of an axle may be uniformly transferred to the entire disc portion 200.

Thereafter, as illustrated in FIG. 14, the integral disc portion 200 may be completed by separating the mold portion chamber 500 after the molten material is completely solidified in the mold portion chamber 500, In addition, the disc portion 200 may use a low-pressure casting method, a sand mold casting method, and the like in addition to the differential pressure casting method, which is a casting method commonly known to those skilled in the art, and thus, detailed description thereof will be omitted.

Figures 15, 16A:
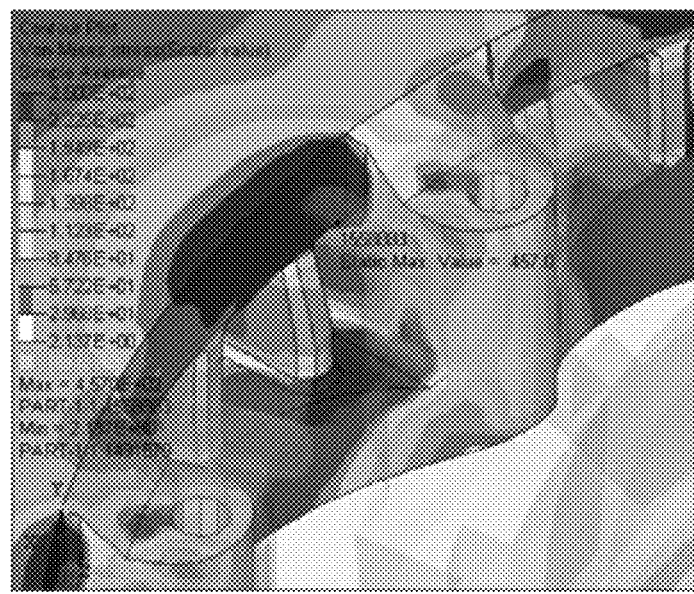
FIG. 15 illustrates a structural analysis result of the vehicle floating disc hub assembly according to the present disclosure and a disc hub assembly of related art.
FIG. 16A is a thermal stress analysis view near a fastener of the vehicle floating disc hub assembly according to the present disclosure.
Figure 16B:
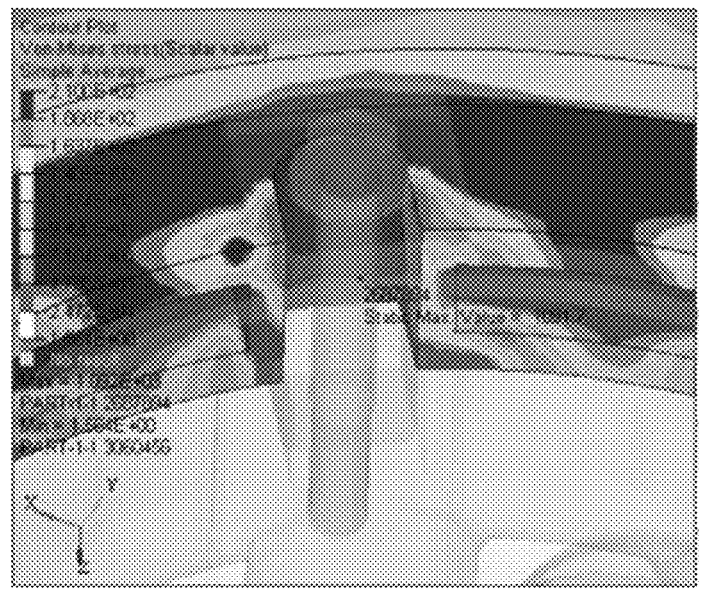
FIGS. 16B and 16C are thermal stress analysis views near a fastener of the disc hub assembly of the related art.
Figure 16C:
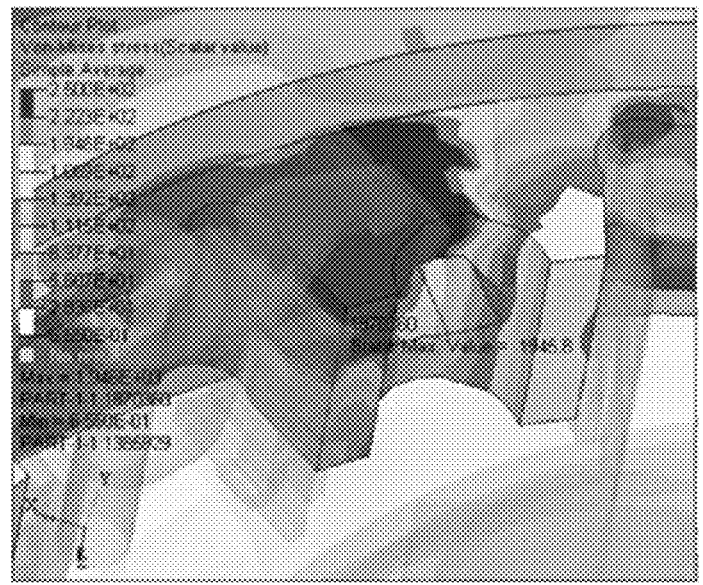
Figure 17A:
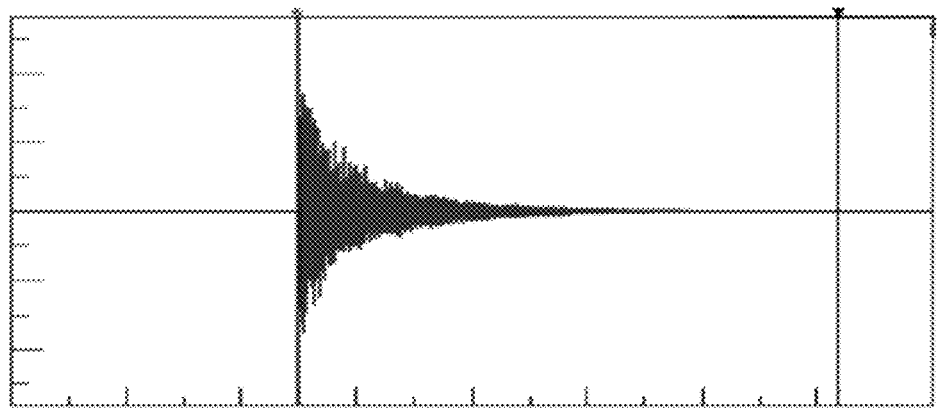
FIG. 17A is a vibration damping analysis view of the disc hub assembly of the related art.
Figure 17B:
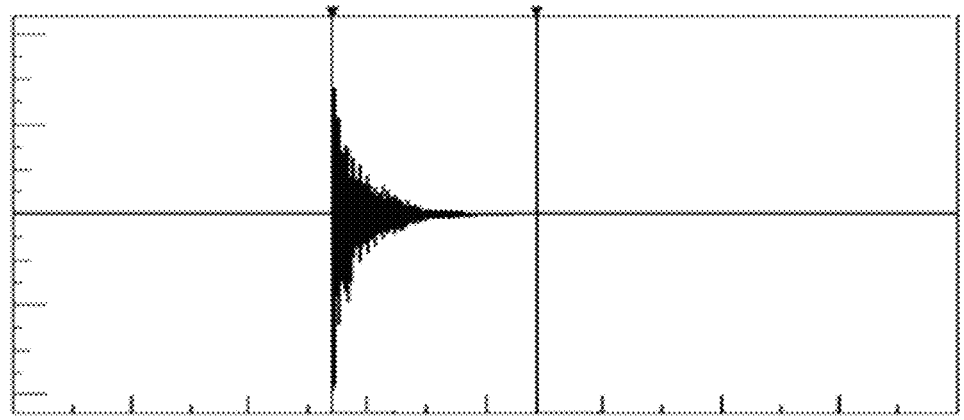
FIG. 17B is a vibration damping analysis view of the vehicle floating disc hub assembly according to the embodiment of the present disclosure.

FIGS. 15 to 17 are materials for demonstrating an effect of a vehicle floating disc hub assembly according to an embodiment of the present disclosure, G. 15A illustrates a structural analysis result of the vehicle floating disc hub assembly according to the present disclosure and a disc hub assembly of related art, FIG. 16A is a thermal stress analysis view near a fastener of the vehicle floating disc hub assembly according to the present disclosure, FIGS. 6B and 6C are thermal stress analysis views near a fastener of the disc hub assembly of the related art, FIG. 17A is a vibration damping analysis view of the disc hub assembly of the related art, and FIG. 17B is a vibration damping analysis view of the vehicle floating disc hub assembly according to the embodiment of the present disclosure.

Here, the embodiment is the vehicle floating disc hub assembly according to the present disclosure, and comparative examples 1 and 2 are disc hub assemblies of the related art.

Referring to FIGS. 15 to 17, the vehicle floating disc hub assembly according to the embodiment of the present disclosure configured as described above has an advantage in that the hub assembly is free to expand in a direction opposite to a centrifugal direction and in an axial direction due to heat generation during braking and is fixed in position by the fastening member 300 or the like thus being excellent in returnability to return to an original position thereof after heat dissipation.

To this end, as illustrated in FIG. 15, the vehicle floating disc hub assembly according to the present disclosure may have effects that a weight is significantly reduced compared to the disc hub assembly of the related art and it is excellent in heat generation temperature and deformation amount of a disc during braking.

In addition, as illustrated in FIGS. 16A to 16C, thermal stress on the fastening portion may be reduced to approximately ½ to ¼ times as compared with the disc hub assembly of the related art.

In addition, as illustrated in FIGS. 17A-17B, vibration and noise are significantly reduced.

Although the embodiments of the present disclosure are described with reference to the accompanying drawings, it will be understood that the present disclosure may be implemented in other specific forms by those skilled in the art in which the present disclosure is involved. Therefore, the above-described embodiments are illustrative in all respects and are not restrictive.

What is claimed is:

1. A vehicle floating disc hub assembly comprising:
   a hub portion comprising:
      a bearing housing disposed on an inner circumferential surface of the hub portion and having a bearing mounted therein, wherein the bearing is configured to couple to an axle;
      a flange portion disposed in one end in an axial direction; and
      a plurality of disc fastening grooves disposed in another end; and
   a disc portion configured to be mounted on the hub portion and comprising a hub fastener corresponding to and configured to be fastened to the plurality of disc fastening grooves through a fastening member,
      wherein the fastening member comprises:
         a spring clip mounted between the plurality of disc fastening grooves and the hub fastener to form a contact force with each of the plurality of disc fastening grooves;
         a spring plate formed to have an elastic force in the axial direction of the axle and disposed in the spring clip; and
         a fastening bolt configured to couple to the hub fastener through the spring plate,
   wherein the plurality of disc fastening grooves are formed such that a direction of an outer peripheral surface of the hub portion is open, and
   wherein the disc portion is formed to have a floating structure configured to be freely deformed in the axial direction and in a radial direction without forcibly constraining thermal deformation.

2. The vehicle floating disc hub assembly of claim 1, wherein the hub portion has a shape in which an outer diameter thereof gradually expands from the plurality of disc fastening grooves to the flange portion, and a plurality of straight ribs are disposed along an outer circumferential surface between the plurality of disc fastening grooves and the flange portion.

3. The vehicle floating disc hub assembly of claim 1, wherein the bearing housing is inserted into the inner circumferential surface of the hub portion and a serration portion is formed on the inner circumferential surface of the hub portion to prevent deviation of the inserted bearing housing.

4. The vehicle floating disc hub assembly of claim 1, wherein the hub fastener comprises:
   an insertion portion protruding along an inner circumferential surface of the disc portion and configured to be insertably mounted into the plurality of disc fastening grooves; and
   a positioning surface for determining a position of the disc portion in the axial direction for the hub portion and for preventing deviation in one axial direction by forming an extended area larger than the each of the plurality of disc fastening grooves on both sides of an end portion thereof with respect to another side of a protruding end of the inserting portion in a fastening bolt inserting direction.

5. The vehicle floating disc hub assembly of claim 4, wherein the each of the plurality of disc fastening grooves is provided with a disc through-hole having an area through which the positioning surface is configured to pass, and
wherein, when the disc portion is being mounted in the hub portion, the disc portion is placed on a circumference of the hub portion and the positioning surface passes through the disc through-hole, and thereafter, the disc portion rotates and the hub fastener faces the plurality of disc fastening grooves in a same axis at a corresponding position, and after the disc portion is pulled and the hub fastener is inserted into the plurality of disc fastening grooves, the disc portion is mounted by being fastened through the fastening member.

6. The vehicle floating disc hub assembly of claim 1, wherein, in the spring clip, a "u"-shaped clip cutting portion is formed in a clip body to provide the elastic force in a vertical direction.

7. The vehicle floating disc hub assembly of claim 1, wherein the spring plate comprises a cutting portion formed in some directions from a bolt through-hole through which an end portion of the fastening bolt passes.

8. The vehicle floating disc hub assembly of claim 1, wherein, in the disc portion, an inner side portion of a circumferential surface forms a step difference of a deeper depth in a direction opposite to the radial direction than an outer side portion of the circumferential surface.

* * * * *